United States Patent [19]

Kim

[11] Patent Number: 6,148,191

[45] Date of Patent: Nov. 14, 2000

[54] MOBILE TELEPHONE OR WLL SUBSCRIBER TERMINAL WITH ACCOUNTING FUNCTION AND METHOD FOR CONTROLLING THE SAME

[75] Inventor: Hoo-Ja Kim, Seoul, Rep. of Korea

[73] Assignee: Samsung Electronics Co., Ltd., Suwon, Rep. of Korea

[21] Appl. No.: 09/076,463

[22] Filed: May 12, 1998

[30] Foreign Application Priority Data

May 12, 1997 [KR] Rep. of Korea ............... 97-18233

[51] Int. Cl.$^7$ ................................................. H04M 11/00
[52] U.S. Cl. ..................... 455/407; 455/406; 455/405
[58] Field of Search .................................. 455/405, 406, 455/407, 408, 550, 566, 575; 379/114, 13, 1, 100.04

[56] References Cited

U.S. PATENT DOCUMENTS

| 5,109,401 | 4/1992 | Hattori et al. ........................ 455/407 |
| 5,303,297 | 4/1994 | Hillis ................................... 455/406 |
| 5,517,555 | 5/1996 | Amadon et al. ...................... 379/59 |
| 5,577,100 | 11/1996 | McGregor et al. .................. 455/406 |
| 5,625,669 | 4/1997 | McGregor et al. .................. 455/418 |
| 5,987,107 | 11/1999 | Brown ................................... 379/114 |

FOREIGN PATENT DOCUMENTS 2265522  9/1993  United Kingdom ......... H04M 15/10

Primary Examiner—Nay Maung
Assistant Examiner—Sonny Trinh
Attorney, Agent, or Firm—Dilworth & Barrese, LLP

[57] ABSTRACT

A mobile telephone with an accounting function enables a user to visually check a call charge through a display unit. The mobile telephone includes a display unit for displaying a call charge according to call charge data, and a controller for calculating the call charge at a predetermined time interval beginning at a time when a call success message is received from a mobile telephone switching office, and providing the call charge data to the display. The mobile telephone includes a memory for storing the call charge, and a keypad with which a user can input charge rate data, wherein the controller stores the charge rate in the memory and calculates the call charge based on the charge rate.

18 Claims, 6 Drawing Sheets

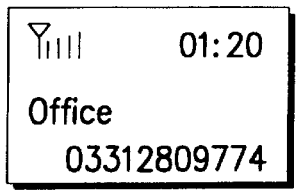
FIG. 1A
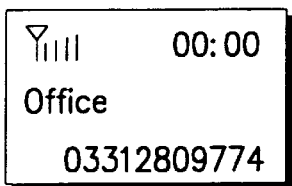 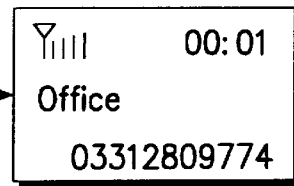
FIG. 1B  FIG. 1C
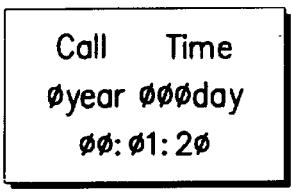
FIG. 1D
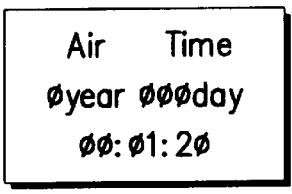
FIG. 1E
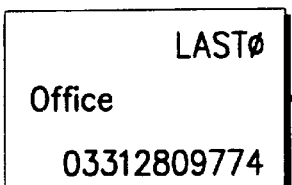 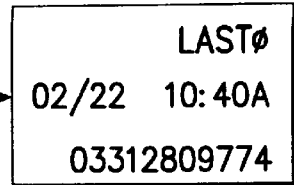
FIG. 1F  FIG. 1G

| Charge_Set | | | | | | | | | | | | |
|---|---|---|---|---|---|---|---|---|---|---|---|---|
| | Charge_View | | | | | | | | | | | |
| | | Charge_rate (0sec 0won) | | | | | | | | | | |
| | | | TEL. NO. | NAME | CALL TIME | CALL DURATION | CALL CHARGE | ... | TEL. NO. | NAME | CALL TIME | CALL DURATION | CALL CHARGE |
| St_Charge[1] | | | | | | | | | | | | |
| St_Charge[2] | | | | | | | | | | | | |
| ... | | | | | | | | | | | | |
| St_Charge[n] | | | | | | | | | | | | |
| | | | P_Charge | P_Charge | P_Charge | P_Charge | P_Charge | | P_Charge | P_Charge | P_Charge |
| | | | Air_Charge | | | | | | | | | |

FIG. 2B

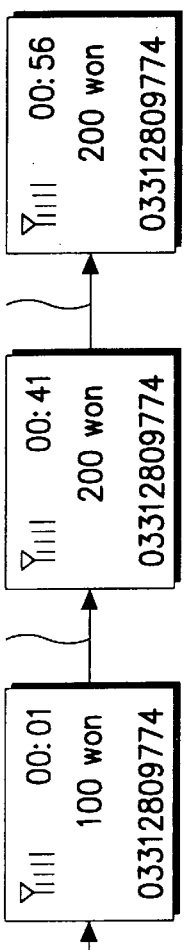
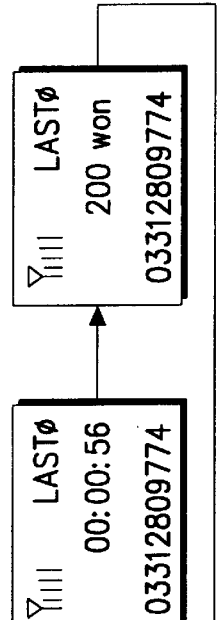
FIG. 5A   FIG. 5B   FIG. 5C   FIG. 5D   FIG. 5E
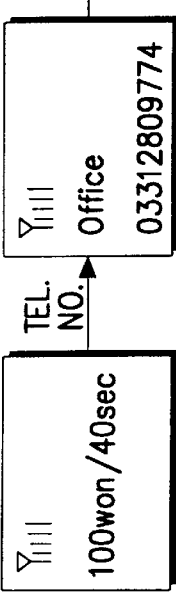
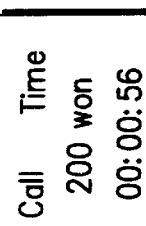
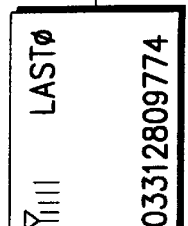
FIG. 5F   FIG. 5G   FIG. 5H   FIG. 5I   FIG. 5J   FIG. 5K

MOBILE TELEPHONE OR WLL SUBSCRIBER TERMINAL WITH ACCOUNTING FUNCTION AND METHOD FOR CONTROLLING THE SAME

BACKGROUND OF THE INVENTION

1. Field of the Invention

The present invention relates to mobile telephones or a wireless local loop (hereinafter denoted as WLL) subscriber terminal, and in particular, to a mobile telephone with an accounting function which enables a user to check a call charge through a display unit and a method for controlling the same.

2. Description of the Related Art

When using a mobile telephone as well as a WLL subscriber terminal, occasionally there is a need for checking the call charge and charging the fare accordingly for the telephone call. For example, in order to offer convenience to the fare (or passenger), a public mobile telephone is installed in a taxi. The taxi driver measures the call duration to charge the fare for the call by using a separate billing apparatus installed in the taxi. The billing apparatus is connected to the mobile telephone via an RS-232C interface, and calculates the call charge based on the call information received from the mobile telephone.

FIGS. 1A through 1G show a display unit of a known mobile telephone, on which various call information is displayed. Specifically, FIG. 1A shows a state where the mobile telephone has been engaged (i.e., in a busy state) for a call duration of 1 minute and 20 seconds; FIG. 1B shows a state where the mobile telephone is dialing the telephone number; FIG. 1C shows a state where the mobile telephone is just connected to a mobile telephone switching office (MTSO); FIG. 1D shows a call time for the last outgoing call; FIG. 1E shows the air time display (i.e., a call duration accumulated up to the present); FIG. 1F shows the called number for the last call, and FIG. 1G shows the last call information including the date and time when the last call was made, respectively.

As illustrated above, the known mobile telephone merely displays the call time and call duration for the previous calls. Thus, when the billing apparatus is not installed in the public mobile telephone, the user (i.e., the driver or fare) is required to manually calculate the call charge based on the call time and call duration displayed on the display unit. This manual calculation is inconvenient and can result in miscalculation. In practice, the call duration begins to be counted, once the mobile telephone is connected to the mobile telephone switching office, regardless of whether the other party answers the outgoing call, as shown in FIG. 1C. Therefore, the displayed call duration may be different from the actual call duration, which leads to additional miscalculation.

SUMMARY OF THE INVENTION

It is therefore an object of the present invention to provide a mobile telephone or a WLL subscriber terminal with an accounting function, which enables a user to visually check a call charge through a display unit thereof, and a method for controlling the same.

It is another object of the present invention to provide a mobile telephone or a WLL subscriber terminal with an accounting function, capable of calculating a call charge based on an adjustable charge rate and displaying the calculated call charge on a display unit thereof, and a method for controlling the same.

It is still another object of the present invention to provide a mobile telephone or a WLL subscriber terminal with an accounting function, capable of calculating a total call charge for the calls made by a certain user and displaying the calculated total call charge on a display unit thereof, and a method for controlling the same.

According to an aspect of the present invention, there is provided a mobile telephone with an accounting function, operating in conjunction with cell sites and mobile telephone switching offices (MTSOs) for transmitting a call success message to an originating party upon receipt of an acknowledge signal from the call receiving party. The mobile telephone includes a display unit for displaying a call charge according to call charge data; and a controller for calculating the call charge at a predetermined time interval beginning at a time when the call success message is received, and providing the call charge data to the display. Further, the mobile telephone includes a memory for storing the call charge, and a keypad with which a user can input charge rate data. The controller stores the charge rate in the memory and calculates the call charge based on the charge rate.

According to another aspect of the present invention, there is provided a method for calculating a call charge of a mobile telephone operating in conjunction with cell sites and mobile telephone switching offices for transmitting a call success message to an originating party upon receipt of an acknowledge signal from the call receiving party. In the method, the receipt of a call success message from the mobile telephone switching office is checked, after the mobile telephone dialed a telephone number for the call receiving party. Upon receipt of the call success message, the mobile telephone starts to count a call duration and checks whether it is time to update the call charge. If it is time to update the call charge, a charge for the current call up to the present is calculated and displayed on a display unit. Then, the mobile telephone checks whether the call has been completed, continues to calculate the call charge if the call is not completed, and stores the call charge calculated up to the present in a memory if the call is completed. The current call charge is added to the call charge accumulated up to the present and stored in the memory.

BRIEF DESCRIPTION OF THE DRAWINGS

The above and other objects, features and advantages of the present invention will become more apparent from the following detailed description when taken in conjunction with the accompanying drawings in which:

FIGS. 1A through 1G are diagrams illustrating various call information displayed on a display unit of a conventional mobile telephone;

FIG. 2B is a memory map of a second memory (113) of FIG. 1;

FIGS. 5A through 5K are diagrams illustrating various call information displayed on a display unit of the mobile telephone according to an embodiment of the present invention.

DETAILED DESCRIPTION OF PREFERRED EMBODIMENTS

A preferred embodiment of the present invention will be described in detail hereinbelow with reference to the accompanying drawings. In the following description, numerous specific details are set forth to provide a more thorough understanding of the present invention. It will be apparent, however, to one skilled in the art that the present invention may be practiced without these specific details. In other instances, well known functions or constructions have not been described so as not to obscure the present invention.

Figure 2A:
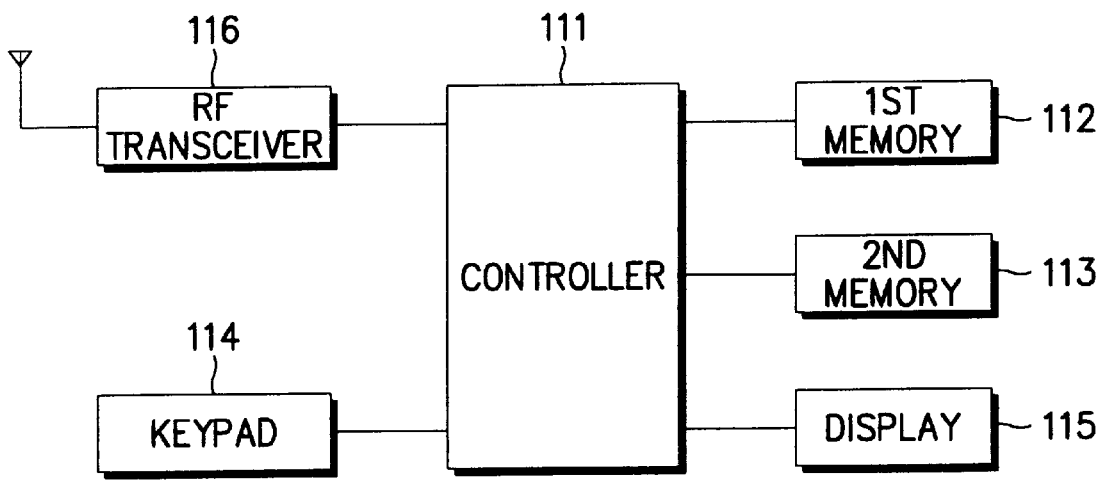
FIG. 2A is a block diagram of a mobile telephone according to an embodiment of the present invention.

Referring to FIG. 2A, a mobile telephone to which the present invention is applied, includes a controller 111, first and second memories 112 and 113, respectively, a keypad 114 being a user interface means, a display unit 115, and an RF (Radio Frequency) transceiver 116. Though not illustrated in the drawing, the mobile telephone further includes a data processor which is composed of a duplexer, a frequency synthesizer, a voice signal processor and a digital signal processor.

The controller 111 controls the overall operation of the mobile telephone, including calculation of the call charge. The first memory 112 can be an EEPROM (Electrically Erasable and Programable Read Only Memory) which stores a program and initial service data. The second memory 113 can be a RAM (Random Access Memory) which stores various data generated during operation of the mobile telephone. The keypad 114 generates key input data for setting various operating modes of the mobile telephone and dialing the telephone number, and provides the key input data to the controller 111. The display unit 115, generally composed of an LCD (Liquid Crystal Display), displays various information of the mobile telephone, such as the called number, the time and date of the call, and the call charge. The RF transceiver 116 demodulates an RF signal input from an antenna, and modulates a transmission signal to transmit the modulated signal via the antenna.

FIG. 2B shows a memory map of the second memory 113 of FIG. 2A. Referring to FIG. 2B, an accounting function setting flag "Charge_Set" indicates whether or not the accounting function is set, and a charge rate view flag "Charge_View" indicates whether to display the charge rate on an initial screen. That is, the controller 111 selectively displays the normal information or the charge rate information on the initial screen, according to the state of the charge rate view flag "Charge_View". A storage area "Charge_Rate" stores data for the charge rate. A plurality of storage areas "P_Charge" store the call charge data for specified users, and a storage area "Air_Charge" stores data for an air charge (i.e., the call charge accumulated up to the present since the purchase of the mobile telephone, or since a time when the mobile telephone is recently reset. Storage areas "St-Charge[1]"–"St-Charge[n]" store the call information for n calls, in which the call information includes telephone number, name, call time, call duration, and call charge. Here, the storage areas "St-Charge[1]"–"St-Charge[n]" are controlled by a queued access method, so that the call information for the last outgoing call can be retrieved in a specific sequence, thereby allowing calculation of the call charge for the last call.

Figure 3:
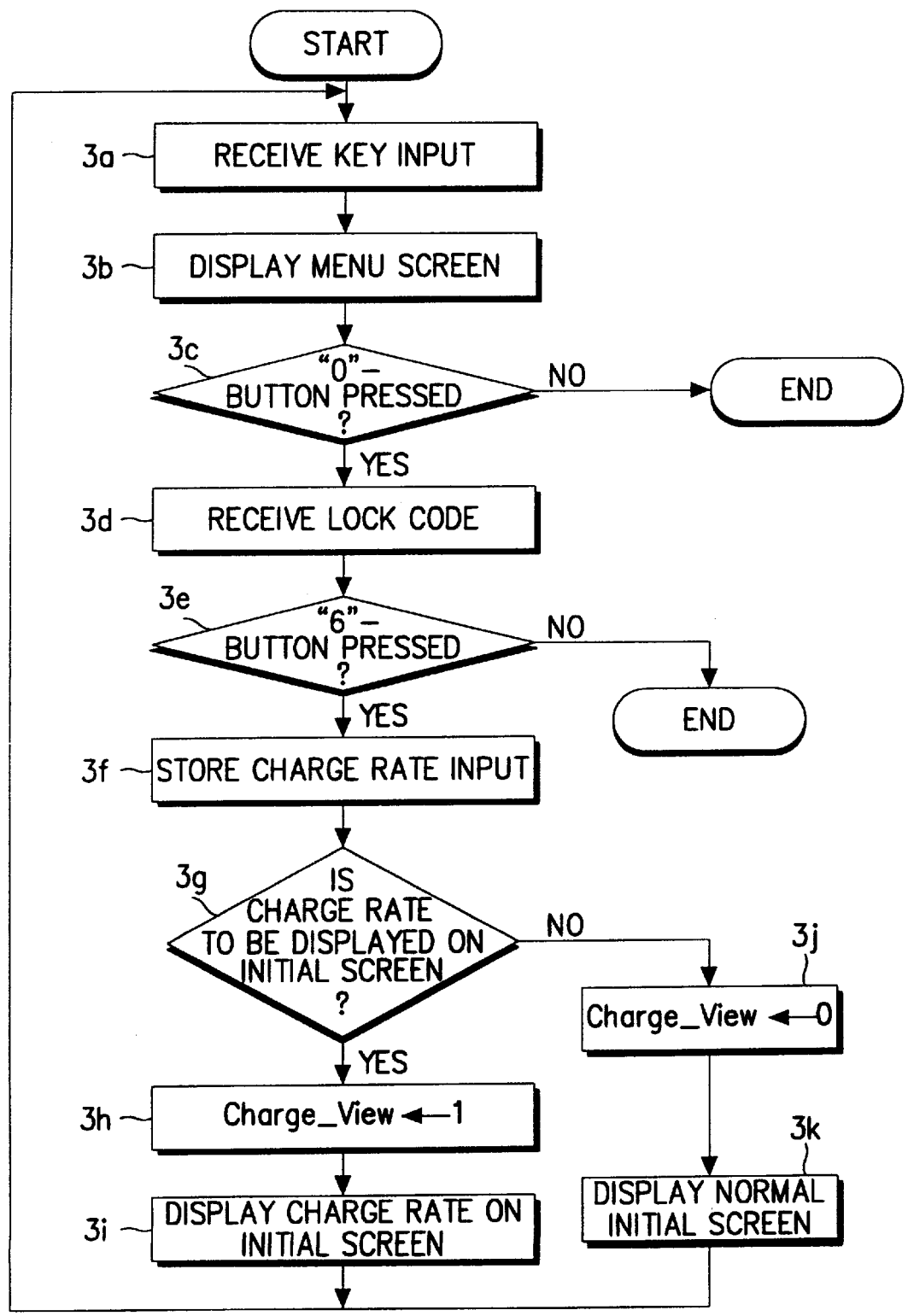
FIG. 3 is a flow chart for setting a charge rate, based on which the mobile telephone calculates the call charge, according to an embodiment of the present invention.

FIG. 3 is a flow chart for setting the charge rate, based on which the mobile telephone calculates the call charge. In case the mobile telephone is installed in the taxi as a public mobile telephone, the charge rate is adjustable when a lessor (i.e., the taxi driver) of the public mobile telephone bills the lessee (i.e., the fare or passenger) for the call charge. If the lessor presses a specific function button (or a user change button) on the keypad 114 to adjust the charge rate, the controller 111 receives the key input data for adjusting the charge rate at step 3a, and displays a menu screen on the display unit 115 at step 3b, to enable the lessor to select the next operation from the menu. At step 3c, the controller 111 checks whether a lock button, e.g., "0"-button, is pressed. If the lock button is pressed, the controller 111 receives a lock code input by the lessor at step 3d. However, if the lock button is not pressed, the controller 111 ends the program. After receiving the lock code, the controller 111 checks at step 3e whether the lessor has pressed a specific button, e.g., "6"-button, indicating a charge rate setting mode. If the "6"-button is pressed, the controller 111 receives the charge rate data that the lessor inputs using the keypad 114 and stores the charge rate data in the second memory 113, at step 3f. Thereafter, at step 3g, the controller 111 displays on the display unit 115 a check message indicating whether to display the charge rate on the initial screen. If the lessor has input an affirmative answer to the check message, the controller 111 sets the charge rate view flag "Charge_View" to "1" at step 3h, and then displays the charge rate on the initial screen of the display unit 115 at step 3i. After that, the controller 111 returns to the step 3a. However, if the lessor has input a negative answer to the check message, the controller 111 sets the charge rate view flag "Charge_View" to "0" at step 3j, and then displays the normal initial screen on the display unit 115 at step 3k. After that, the controller 111 returns to the step 3a.

Figure 4:
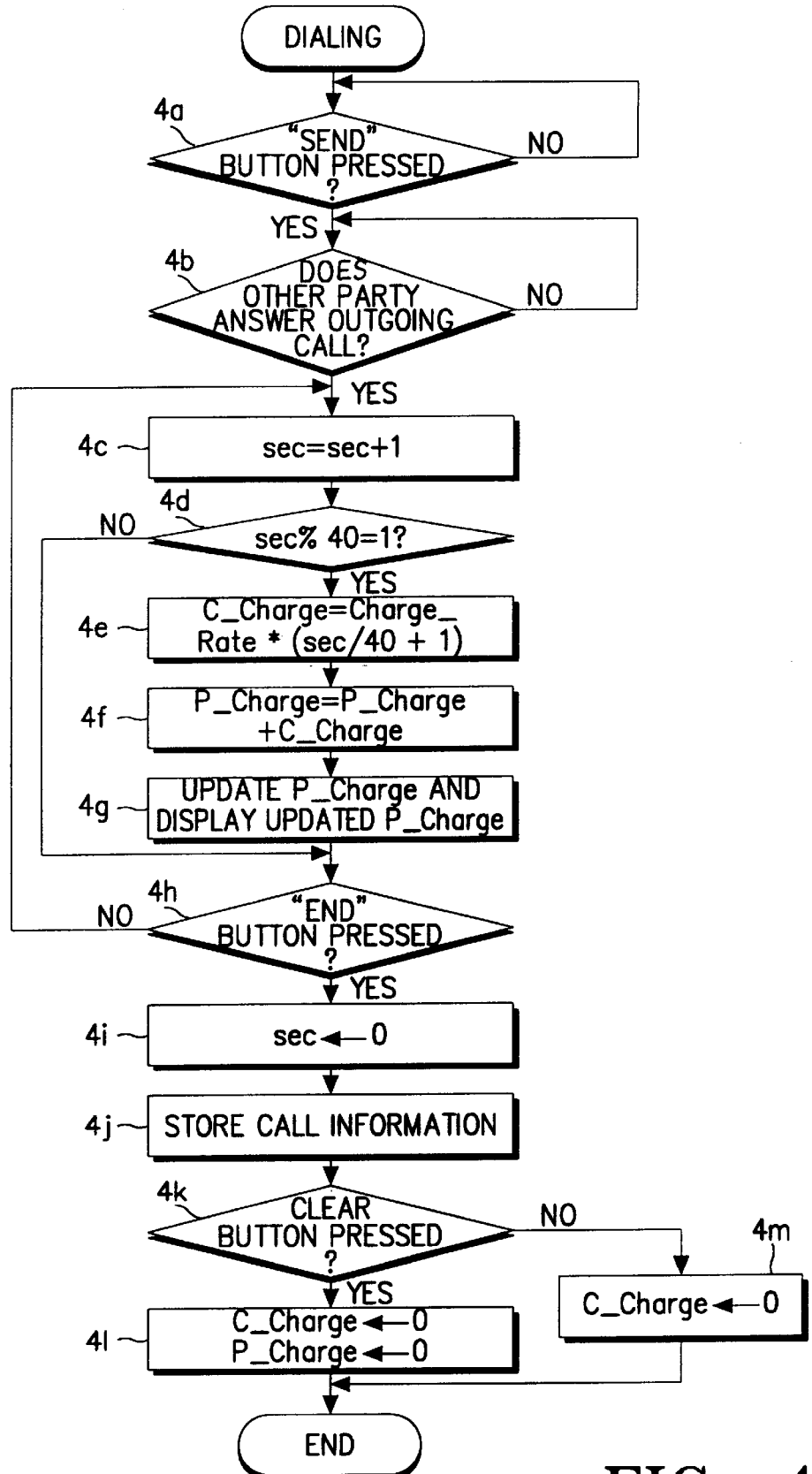
FIG. 4 is a flow chart for calculating the call charge based on the charge rate according to an embodiment of the present invention.

FIG. 4 is a flow chart for calculating the call charge based on the charge rate according to the present invention. Here, it should be noted that the above control flow can be applied to the mobile telephone for individual use as well as the public mobile telephone. When the private mobile telephone is for individual use, the charge rate coincides with a charge rate of the telephone service provider. However, in case of the public mobile telephone, the charge rate should be adjusted by the procedure shown in FIG. 3. The flow chart of FIG. 4 can be applied to the public mobile telephone.

Referring to FIG. 4, the controller 111 scans the keypad 114 at step 4a to check whether the user has pressed dial buttons and a SEND button subsequently. If the SEND button is pressed, the controller 111 checks at step 4b whether the other party (i.e., call receiving party) answers the outgoing call, by detecting a call success message (i.e., an alert-with-information message) which is transmitted from the mobile telephone switching office when the other party answers the outgoing call. Thus, it is possible to count the call duration beginning at the actual call time, not beginning at the time when the SEND button is pressed. Accordingly, it is possible to accurately calculate the call charge.

If the call success message is detected at step 4b, it indicates that the communication path to the other party is connected, allowing the user to begin the telephone conversation. In the meantime, if the user completes the telephone conversation, the controller 111 calculates the charge for the telephone call and stores the calculated call charge. Specifically, the controller 111 starts to count the call duration "sec" at step 4c, and checks at step 4d whether a specified time has elapsed. Here, the specified time refers to a unit time, in the unit of which the call charge is updated. In the exemplary embodiment shown, it is assumed that the call charge is updated every 40 seconds. In this case, by performing a modulo 40 counting operation, it is possible to check whether it is time to update the call charge. That is, the controller 111 checks at step 4d whether "sec %40" is "1" or not. If so, the controller 111 judges that it is time to update the call charge, and calculates the current call charge "C_Charge" at step 4e in accordance with Equation (1).

$$C\_Charge = Charge\_Rate * (sec/40 + 1) \quad (1)$$

After that, the controller 111 calculates the personal call charge "P-Charge" at step 4f using the above call charge in accordance with Equation (2), and stores the calculated value in the second memory 113. Here, the personal call charge refers to the total charge for the calls made by a specific user.

$$P\_Charge = P\_Charge + C\_Charge \qquad (2)$$

Then, at step 4g, the controller 111 updates the call charge "P_Charge", and displays the updated call charge on the display unit 115. The controller 111 scans the keypad 114 at step 4h, to check whether the user has pressed an END button. If the END button is pressed, the controller 111 initializes the call duration "sec" to "0" at step 4i. After initialization of the call duration, the controller 111 stores the called number, the call duration, and the calculated call charge in the second memory 113, at step 4j. Then, the controller 111 checks at step 4k whether the user has pressed a clear (CLR) button. If the clear button is pressed, the controller 111 clears the current call charge "C_Charge" and the personal call charge "P_Charge" to "0", and then ends the call. On the contrary, if the clear button is not pressed, the controller 111 clears only the current call charge "C_Charge" to "0" at step 4m, preparing for the case that the same user makes another call, and then ends the call.

The mobile telephone according to the present invention stores the call information for the outgoing calls in the form of a stack (i.e., in a specific sequence). In other words, every outgoing call has an address assigned thereto, so that the called number for the outgoing call, the call duration and the call charge are stored in the assigned storage areas of the memory.

The mobile telephone can have one or more inherent telephone numbers. When the mobile telephone has a plurality of the telephone numbers, the current call charge "C_Charge" and the personal call charge "P_Charge" are also divided according to the respective telephone numbers, so as to separately calculate the call charge by the telephone numbers.

FIGS. 5A through 5K are diagrams illustrating various call information displayed on the display unit 115 of the mobile telephone, in which it is assumed that a certain user has dialed 0331-280-9774 and talked over the telephone for 56 seconds. FIG. 5A shows the initial screen on which the charge rate (of 100 won/40 sec; here "won" is a monetary unit of South Korea) is displayed. Other forms of currency or monetary units can be used without departing from the scope of this disclosure. FIG. 5B shows a state where the outgoing telephone number is input; FIG. 5C shows a state where the other (called) party has answered the outgoing call after the user pressed the SEND button; FIG. 5D shows a state where 40 seconds has elapsed; and FIG. 5E shows a state where an additional 25 seconds has elapsed and the user has pressed the END button. It is shown from FIG. 5A–5E that the user is charged 100 wons every 40 seconds. Further, FIG. 5F shows the call charge for the last call displayed on the display unit 115, and FIG. 5G the air time. As illustrated, since the current call charge is identical to the air charge, it is inferred that the user has made only one phone call. FIGS. 5H–5K show the call information for the last call displayed in sequence by toggling the screen. Specifically, FIG. 5H shows a state where the last called telephone number is displayed on the display unit 115; FIG. 5I shows a state where the called number, and the time and date for the last call are displayed on the display unit 115; FIG. 5J shows a state where the called number and the call duration for the last call are displayed; and FIG. 5K shows a state where the called number and the call charge for the last call are displayed.

The above described method for calculating the call charge can be applied to any of a CDMA mobile telephone, a GSM (Global Systems for Mobile communication) mobile telephone, and a WLL (Wireless Local Loop) mobile telephone.

As described above, the mobile telephone with the accounting function enables the user to visually check a call charge through the display unit thereof, without the separate billing apparatus.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A mobile telephone with an accounting function, operating in conjunction with cell sites and mobile telephone switching offices (MTSOs), comprising:

a display unit for displaying a real time call charge according to call charge data;

a receiver for receiving a call success message from a mobile telephone switching office; and a controller for calculating the real time call charge at a predetermined time interval beginning at a time when the call success message is received, and providing the call charge data to the display unit a clear button, when pressed, initializing both the call charge and the personal call charge; and initializing only the current call charge when the clear button is not pressed.

2. The mobile telephone as claimed in claim 1, further comprising a memory for storing the call charge.

3. The mobile telephone as claimed in claim 1, further comprising:

user interface means for inputting charge rate data; and a memory for storing the charge rate, said controller calculating the call charge based on the charge rate.

4. The mobile telephone as claimed in claim 2, further comprising user interface means for receiving user input charge rate data, said controller storing the charge rate data in the memory and calculating the call charge based on the charge rate.

5. A mobile telephone with an accounting function, operating in conjunction with cell sites and mobile telephone switching offices (MTSOs), comprising:

a receiver for receiving a call success message from a mobile telephone switching office;

a controller for calculating a real time call charge at a predetermined time interval beginning at a time when the call success message is received, and adding a call charge for a current call to a call charge for a previous call upon completion of the current call so as to calculate a real time total call charge for a specified user;

a display unit for displaying the real time total call charge according to call charge data from the controller; and a memory for storing the call charge data output from the controller a clear button, when pressed, initializing both the call charge and the personal call charge; and initializing only the current call charge when the clear button is not pressed.

6. The mobile telephone as claimed in claim 5, wherein said memory has storage areas for storing accounting function setting information, the charge rate, the call charge, an air charge, and call information, said call information including a telephone number, call duration, and the call charge data.

7. The mobile telephone as claimed in claim 5, wherein said memory further comprises a storage area for storing charge rate view setting information, said controller selectively displaying normal information or the charge rate on an initial screen of the display unit according to the charge rate view setting information.

8. The mobile telephone as claimed in claim 5, further comprising user interface means for enabling a user to input charge rate data, said controller storing the charge rate in the memory and calculating the call charge based on the stored charge rate.

9. A method for calculating a real time call charge of a mobile telephone operating in conjunction with cell sites and mobile telephone switching offices (MTSOs) for transmitting a call success message to an originating party upon receipt of an acknowledge signal from a call receiving party, comprising the steps of:

a) checking whether the call success message is received from the mobile telephone switching office;
   b) starting a call duration counter upon receipt of the call success message;
   c) checking whether it is time to update the call charge;
   d) calculating a charge for the current call up to the present time when it is time to update the call charge, and displaying the calculated real time call charge;
   e) checking whether the call is completed;
   f) repeating steps d)–e) when the call is not completed; and
   g) storing the calculated call charge up to the present time in a memory when the call is completed
   h) initializing both the current call charge and the personal call charge when the clear button is pressed; and
   I) initializing only the current call charge when the clear button is not pressed.

10. The method for calculating a call charge as claimed in claim 9, wherein said step of checking for a success message is performed after a telephone number for the call receiving party has been dialed.

11. The method for calculating a call charge as claimed in claim 9, further comprising the step of adding the call charge calculated in said step d) to a call charge accumulated up to the present and storing the added call charge in the memory.

12. The method for calculating a call charge as claimed in claim 9, further comprising the steps of setting a charge rate, said step of calculating the call charge being based on the set charge rate.

13. A method for calculating a real time call charge of a mobile telephone operating in conjunction with cell sites and mobile telephone switching offices (MTSOs) for transmitting a call success message to a call originating party upon receipt of an acknowledge signal from a call receiving party, comprising the steps of:

a) checking whether the call success message is received from the mobile telephone switching office, after a telephone number for the call receiving party has been dialed;
   b) starting a call duration counter upon receipt of the call success message, and checking whether it is time to update the call charge;
   c) if it is time to update the call charge, calculating a charge for the current call up to the present, adding the calculated call charge to a last call charge to calculate a personal call charge, and displaying the calculated real time call charge;
   d) checking whether the call is completed, and storing the call charge calculated up to the present in memory when the call is completed;
   e) repeating step c) if the call is not complete;
   f) checking whether a clear button is pressed;
   g) initializing both the current call charge and the personal call charge when the clear button is pressed; and
   h) initializing only the current call charge when the clear button is not pressed.

14. The method for calculating a call charge as claimed in claim 13, further comprising the step of setting a charge rate, said step of calculating the call charge being based on the charge rate.

15. A wireless local loop (WLL) subscriber terminal with an accounting function, operating in conjunction with cell sites and WLL subscriber terminal switching offices for transmitting a call success message to a call originating party upon receipt of an acknowledge signal as to a specific call from a call receiving party, comprising:

a receiver for receiving a call success message from the WLL subscriber terminal switching offices;
   a display unit for visually displaying a real time call charge according to call charge data;
   a memory for storing said real time call charge;
   user interface means for inputting charge rate data; and
   a controller for calculating the real time call charge at a predetermined time interval beginning at a time when the call success message is received, storing input charge rate data in the memory and calculating the real time call charge based on the input charge rate data and providing the real time call charge data to the display unit a clear button, when pressed, initializing both the call charge and the personal call charge; and initializing only the current call charge when the clear button is not pressed.

16. A WLL subscriber terminal as claimed in claim 15, wherein said memory further comprises storage areas for storing accounting function setting information, the charge rate data, a personal call charge, and accumulated call charge, and call information, said call information including a telephone number, call duration and the call charge data.

17. A method for calculating a real time call charge of a WLL subscriber terminal operating in conjunction with cell sites and WLL subscriber terminal switching offices (MTSOs) for transmitting a call success message to a call originating party upon receipt of an acknowledge signal from a call receiving party, comprising the steps of:

a) checking whether the call success message is received from the WLL subscriber terminal switching office, after a telephone number for the call receiving party has been dialed by the WLL subscriber terminal;
   b) starting a call duration counter upon receipt of the call success message, and checking whether it is time to update the call charge;
   c) if it is time to update the real time call charge, calculating a charge for the current call up to the present, and adding the calculated real time call charge to a call charge accumulated up to the present to display the call charge;
   d) checking whether the call is completed after displaying the real time call charge, and storing the real time call charge calculated up to the present in a memory when the call is completed;
   e) repeating step c) if the call is not complete;
   f) checking whether a clear button is pressed after storing the calculated real time call charge;
   g) initializing both the current call charge and a personal call charge when the clear button is pressed; and
   h) initializing only the current call charge when the clear button is not pressed.

18. The method as claimed in claim 17, further comprising the step of adding the personal call charge to the call charge accumulated up to the present, and storing the added call charge in memory.

* * * * *